Dec. 18, 1923.
T. OKAMOTO
CULTIVATOR
Filed March 9, 1922
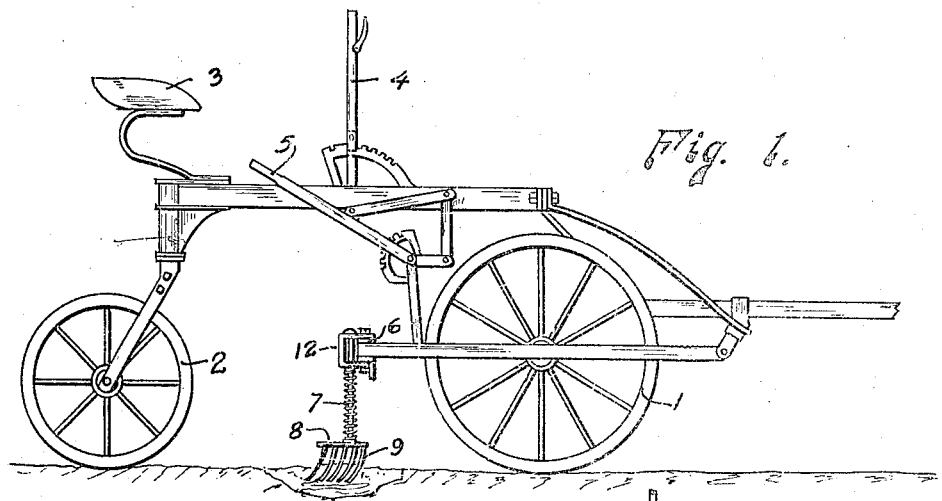
Fig. 1.
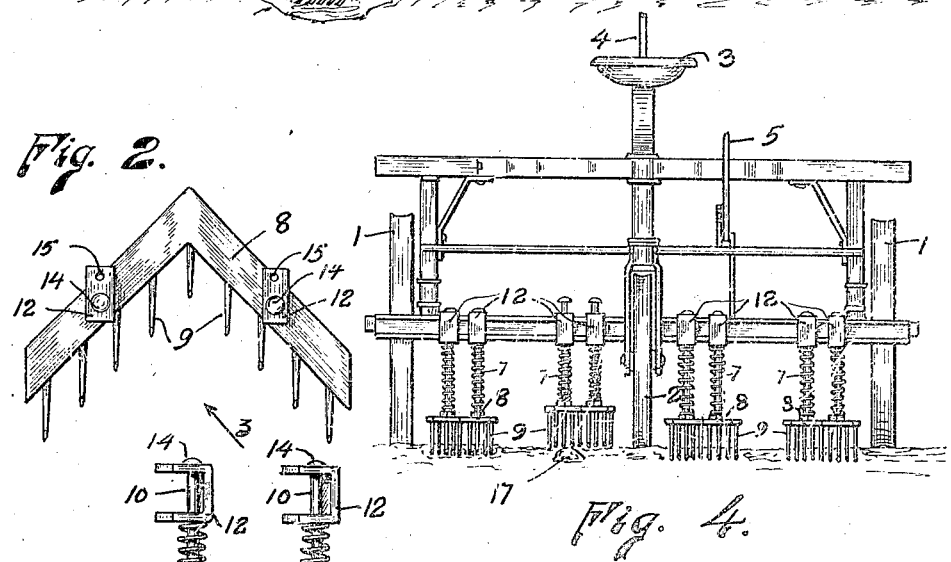
Fig. 2.
Fig. 4.
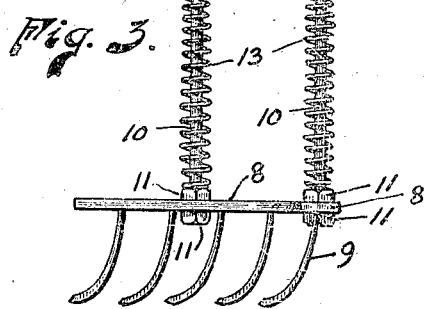
Fig. 3.
Inventor
Tomotaro Okamoto.
By A. J. O'Brien
Attorney Patented Dec. 18, 1923.

1,477,846

UNITED STATES PATENT OFFICE.

TOMOTARO OKAMOTO, OF FORT LUPTON, COLORADO.

CULTIVATOR.

Application filed March 9, 1922. Serial No. 542,370.

*To all whom it may concern:*

Be it known that I, TOMOTARO OKAMOTO, a subject of the Emperor of Japan, residing at Fort Lupton, county of Weld, and State of Colorado, have invented certain new and useful Improvements in Cultivators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to cultivators and has special reference to a special kind of tool to be employed in the cultivation of sugar beets, potatoes and similar crops.

It is well known that the surface of the ground becomes "baked" or covered with a hard skin or layer after a heavy rain or after it has been thoroughly soaked by irrigation. This upper crust or skin is of considerable thickness, and when the cultivator is employed, the cultivator teeth will break the crust into pieces of varying size and some of them will be thrown over and onto the tender plants, killing the same.

It is the object of this invention to provide a tool that can be attached to an ordinary cultivator, and which is so designed that it will scarify or cut the crust so as to prevent the formation of large cakes when the cultivator teeth come along and stir the ground.

In order to more clearly describe my invention, I shall have reference to the attached drawing in which—

Fig. 1 shows a side elevation of a cultivator equipped with my improved cultivator tool;

Fig. 2 is a top plan view of my tool detached from the cultivator;

Fig. 3 is an elevation of my tool taken in the direction of arrow 3, Fig. 2; and Fig. 4 shows a rear view of a cultivator equipped with my improved tool.

The same reference numerals will be used to indicate the same parts throughout the several views.

In Fig. 1 I have shown a side view of an ordinary riding cultivator which has two front wheels 1, a rear wheel 2, a seat 3, and controlling levers 4 and 5. To the usual transverse bar 6 I attach my improved cultivator tool 7 which I will now describe.

My improved cultivator tool consists of a bar 8 of rectangular cross section, which has attached to the under side thereof a plurality of rearwardly bent teeth 9, the upper ends of which are firmly secured to the bar 8 as by welding. Bar 8 is preferably V-shaped, with the open end directed rearwardly. Secured to the bar 8 at points spaced equidistantly from the vertex of the V are two rods 10. The lower ends of said rods are preferably provided with two nuts 11, by means of which they are clamped firmly in place on the bar 8 in the manner clearly shown in Fig. 3. Secured to the upper ends of rods 10 are U-shaped members 12, which have holes near the bottom thereof for the reception of the bars. Surrounding said bars 10 are open cylindrical springs 13 which are in a state of compression, whereby members 12 are resiliently held against the bottom of heads 14. Members 12 are provided near their open ends with holes 15 which serve to receive bolts 16, by means of which they are secured to the transverse bar 6. The parts are so proportioned that when the cultivator tool 7 is attached to the transverse bar 6, the force exerted by the springs 13 will be sufficient to force the curved ends of teeth 9 through the upper crust of the ground, and thereby to cut it into narrow strips which will easily be broken into small pieces when the ground is stirred by the ordinary cultivator teeth, which may either be attached to the same cultivator at the rear of the scarifiers shown, or which may be attached to a different cultivator which follows the one illustrated in the drawing. It will be evident that because the teeth 9 are rearwardly bent, they will not dig into the ground, but will slide over the same in the manner of a sled runner. On account of the fact that springs 13 exert a considerable force on the bar 8, and the further fact that teeth 9 are somewhat flattened on the sides, they will be forced downwardly with sufficient force to cut the hardened crust. If a stone or other unyielding substance, such as 17 in Fig. 4, appears in the path of the tool, the springs 13 will yield and permit the teeth 9 to slide over the same; this insures the apparatus against breakage.

From the above it will appear that I have provided a simple cultivator tool that can be easily made and which will enable the farmer to cut the hardened crust of the ground into strips that will readily be broken up into small pieces, which will not injure the tender plants when they come in contact therewith, thus insuring a more satisfactory job with a great deal less destruction of plants than formerly.

Although I have shown my cultivator tool attached to a four row cultivator, it is of course immaterial to what size cultivator they are attached, and it is my intention to employ them on cultivators adapted to cultivate from four to eight rows.

Having now described my invention, what I claim as new is:

1. A cultivator tool comprising a V-shaped supporting bar, a plurality of teeth secured to the under side of said bar and turned away from the front towards the rear thereof, a pair of bolts secured to said bar at substantially equal distances from the vertex thereof, a U-shaped clamping member slidable on each of said bolts, and a spring surrounding said bolts and abutting against said bar and said U-shaped clamping members.

2. A cultivator tool consisting of a supporting bar, a plurality of teeth secured to and projecting from one side thereof, a pair of bars secured to said supporting bar and projecting at right angles thereto, U-shaped clamping members slidably secured to said last named bars, and springs surrounding said bars and abutting against the bar and said clamping members.

In testimony whereof I affix my signature.

TOMOTARO OKAMOTO.